(No Model.)

E. & H. H. WAYLAND.
HORSE HAY RAKE.

No. 279,057. Patented June 5, 1883.

WITNESSES
Chas. R. Burr
W. E. Bowen

INVENTOR
Eli Wayland
Henry H. Wayland
By Myers & Co
Attorney

UNITED STATES PATENT OFFICE.

ELI WAYLAND, OF MONROE CITY, AND HENRY H. WAYLAND, OF SALISBURY, MISSOURI.

HORSE HAY-RAKE.

SPECIFICATION forming part of Letters Patent No. 279,057, dated June 5, 1883.

Application filed February 1, 1883. (No model.)

*To all whom it may concern:*

Be it known that we, ELI WAYLAND and HENRY H. WAYLAND, citizens of the United States of America, ELI WAYLAND residing at Monroe City, in the county of Monroe and State of Missouri, and HENRY H. WAYLAND residing at Salisbury, in the county of Chariton and State of Missouri, have invented certain new and useful Improvements in Horse Hay-Rakes, of which the following is a specification, reference being had therein to the accompanying drawings.

This invention pertains to improvements in horse hay-rakes for raking hay to a stacker, &c., having for its object to facilitate the operation by the driver or rider of the rake in elevating and depressing the teeth, and to prevent liability of the points of the teeth digging into the ground; and the invention consists in the combination and arrangements of parts, substantially as hereinafter more fully set forth and claimed.

Figure 1:
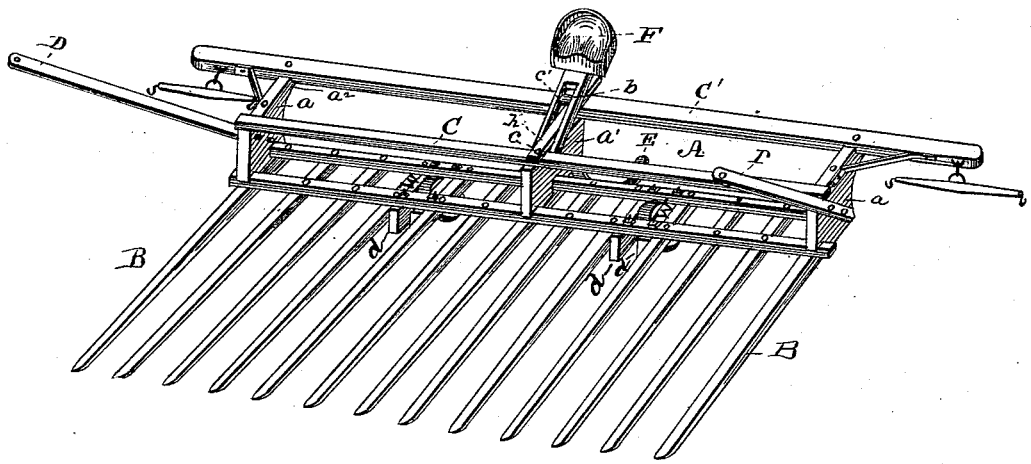
Figure 2:
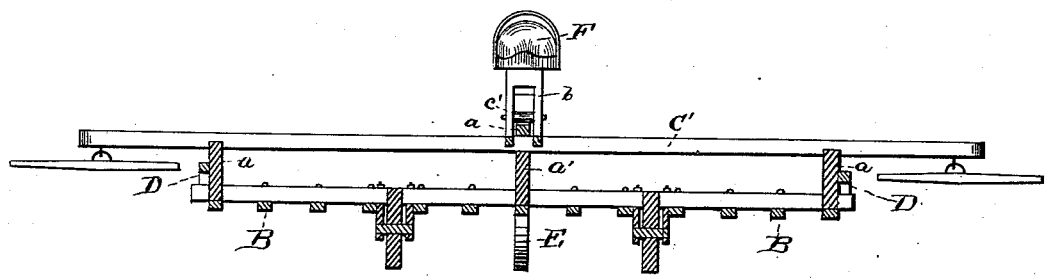
Figure 3:
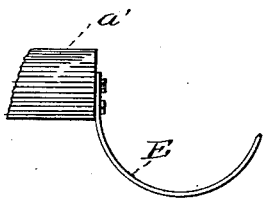

In the accompanying drawings, Figure 1 is a perspective view of our improved horse hay-rake. Fig. 2 is a longitudinal section thereof. Fig. 3 is a detail view of the spring E.

In carrying out our invention, we construct the rake with the head A, which consists of a number of cross-bars fastened to two side shoes, $a\, a$, and a middle shoe, $a'$, and with a series of teeth, B B, fastened to the lower side of the cross-bars. The shoes $a\, a'$ extend well back or rearward, as at $a^2$, and across these rear portions or extensions, $a^2$, is fastened an upper cross-bar, $C'$, while across their forward ends is fastened a similar bar, C. The rear cross-bar, C, extends some distance beyond each end of the rake-head, said portions being suitably braced, as shown, and having whiffletrees attached thereto.

D D are "backing-poles," to the forward ends of which are attached the breast-straps of the horses, their rear ends being secured one to each of the side shoes, $a$. This arrangement permits the application of the draft to the rake, at an elevated point, at its rear end, to prevent the liability of the points of the teeth digging into the ground, as has heretofore been the case with other rakes of this class.

A spring, E, is affixed to the under side of the rearwardly-extended portion of the side middle shoe, $a'$, to receive the weight of the driver or rider as he adjusts himself, as presently described, in elevating the forward ends or points of the rake-teeth.

F is the driver's seat, mounted upon parallel bars $b$ at their upper ends, said bars being disposed in an inclined position, with their lower ends connected together by a roller, $c$, adapted to have movement beneath and against a bar, $h$, and upon the middle shoe, said bar being fastened directly over the middle shoe, and to the cross-bars C C', a second roller, $c'$, being hung between the said seat-bars $b$, and bearing or having movement upon the bar $h$.

The rider or driver in withdrawing the teeth from the hay backs his team, and in elevating the points of the teeth inclines himself in his seat rearward. This is accomplished in connection with the small wheels W, which wheels have their bearings on an axle-bar projected transversely across frame $d$. If the rake is to be turned around, he stops one horse and starts up the standing horse, and when the turn has been made the standing horse then unites with the already moving horse.

If it is desired to form "windrows," the operation of backing the team by the driver, to withdraw the teeth, and inclining himself in his seat rearward, is repeated in performance of the work.

We claim and desire to secure by Letters Patent—

1. The combination of the rake-head A, having side shoes, $a\, a$, and middle shoe, $a'$, backing-poles D, spring E, and driver's seat F, substantially as shown, and for the purpose described.

2. The combination of the seat F, bars $b$, rollers $c$ and $c'$, bar $h$, cross-bars C C', and spring E, substantially as shown, and for the purpose described.

3. The combination, with the rake, having its center rearwardly-projecting shoe provided on its under side with a spring adapted to come in contact with the ground, of the inclining or adjustable seat, in connection with wheels W, substantially as and for the purpose set forth.

In testimony whereof we affix our signatures in presence of two witnesses.

ELI WAYLAND.
HENRY H. WAYLAND.

Witnesses:
R. B. BRISTOW,
S. B. GILLILAND.